(12) United States Patent
Byun (10) Patent No.: US 8,551,639 B2
(45) Date of Patent: Oct. 8, 2013

(54) BATTERY PACK WITH WATERPROOF AND HEAT-DISSIPATING CASE

(75) Inventor: Jeong-Deok Byun, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 412 days.

(21) Appl. No.: 12/910,110

(22) Filed: Oct. 22, 2010

(65) Prior Publication Data

US 2011/0123851 A1 May 26, 2011

(30) Foreign Application Priority Data

Nov. 23, 2009 (KR) .................. 10-2009-0113352

(51) Int. Cl.
*H01M 2/06* (2006.01)
*H01M 6/46* (2006.01)

(52) U.S. Cl.
CPC .................................. *H01M 6/46* (2013.01)
USPC ............. 429/153; 429/149; 429/154; 429/96; 429/100

(58) Field of Classification Search
USPC .......................... 429/149, 153, 154, 96, 100
See application file for complete search history.

(56) References Cited

U.S. PATENT DOCUMENTS

| | | | | |
|---|---|---|---|---|
| 2,978,363 A | * | 4/1961 | Loebich et al. | 428/384 |
| 4,865,903 A | * | 9/1989 | Adiletta | 428/215 |
| 5,337,891 A | * | 8/1994 | Toth | 206/316.2 |
| 5,372,429 A | * | 12/1994 | Beaver et al. | 383/109 |
| 5,418,083 A | | 5/1995 | Tamaki et al. | |
| 5,422,200 A | * | 6/1995 | Hope et al. | 429/157 |
| 2007/0002559 A1 | | 1/2007 | Uke | |
| 2007/0009801 A1 | | 1/2007 | Inagaki et al. | |

FOREIGN PATENT DOCUMENTS

| | | | |
|---|---|---|---|
| JP | 11-086811 | | 3/1999 |
| JP | 2004-103417 | | 4/2004 |
| JP | 2005129260 A | * | 5/2005 |
| JP | 2005-317456 | | 11/2005 |
| JP | 2007317579 | | 12/2007 |
| JP | 2008-293863 | | 12/2008 |
| KR | 10-2000-0075082 | | 12/2000 |

OTHER PUBLICATIONS

Korean Office Action issued by KIPO, dated Mar. 28, 2011, corresponding to Korean Patent Application No. 10-2009-0113352, together with Request for Entry.

* cited by examiner

*Primary Examiner* — Zachary Best
(74) *Attorney, Agent, or Firm* — Robert E. Bushnell, Esq.

(57) ABSTRACT

A battery pack including a core pack having a number of battery cells; a waterproof and heat-dissipating case formed of a flexible material that surrounds the core pack; and wiring that is electrically connected to the core pack and is drawn out of the waterproof and heat-dissipating case. A waterproof structure that prevents water penetration is formed in a portion of the waterproof and heat-dissipating case from where the wiring is drawn. Accordingly, water from the outside is effectively prevented from entering the battery pack and heat of the battery cells may be effectively dissipated out of the battery pack.

16 Claims, 5 Drawing Sheets

BATTERY PACK WITH WATERPROOF AND HEAT-DISSIPATING CASE

RELATED APPLICATIONS

This application claims the benefit of Korean Patent Application No. 10-2009-0113352, filed on Nov. 23, 2009, in the Korean Intellectual Property Office, the disclosure of which is incorporated herein in its entirety by reference.

BACKGROUND

1. Field

The general inventive concept of the present invention relates to a battery pack having a waterproof and heat-dissipating case.

2. Description of the Related Art

Recently, as the technology for portable appliances has progressed and demand for such products has increased, demand for secondary batteries as a power source for the portable appliances has also seen a rapid increase.

The above information disclosed in this Related Art section is only for enhancement of understanding of the background of the described technology and therefore it may contain information that does not form the prior art that is already known in this country to a person of ordinary skill in the art.

SUMMARY

An aspect of the present invention includes a waterproof battery pack.

Another aspect of the present invention includes a battery pack capable of effectively dissipating heat that is generated during an operation out of the battery pack.

Additional aspects will be set forth in part in the description which follows and, in part, will be apparent from the description, or may be learned by practice of the presented embodiments.

According to one or more embodiments of the present invention, a battery pack includes: a core pack comprising a plurality of battery cells; a waterproof and heat-dissipating case formed of a flexible material and for surrounding the core pack; and wiring that is electrically connected to the core pack and is drawn out of the waterproof and heat-dissipating case, wherein a waterproof structure for preventing water penetration is formed in a portion of the waterproof and heat-dissipating case from which the wiring is drawn.

The core pack may include a holder case including a plurality of cell spaces in which the plurality of battery cells are accommodated.

Terminals of the plurality of battery cells may be exposed out of the cell spaces and the core pack may include a lead plate that connect the terminals of the plurality of battery cells to one another.

The waterproof and heat-dissipating case may include a fibrous material selected from the group consisting of polyamide, ceramic-based fiber, cellulose fiber, woven fabric, and non-woven fabric.

One selected from the group consisting of polyimide, polyethylene imide (PE), polyethylene terephthalate (PET), poly tetra fluoro ethylene, and expanded poly tetra fluoro ethylene may be combined to the fiber.

The waterproof and heat-dissipating case may include a material selected from the group consisting of polyimide, polyethylene imide (PE), polyethylene terephthalate (PET), poly tetra fluoro ethylene, and expanded poly tetra fluoro ethylene.

The waterproof structure may include an accommodating portion including an opening portion at one side through which the waterproof and heat-dissipating case accommodates the core pack and a cover that covers the opening portion, and the wiring may be drawn out of the battery pack via a bonding portion between the accommodating portion and the cover.

The battery pack may further include an adhesive portion that bonds the accommodating portion, the cover, and the wiring, between the accommodating portion and the cover. The adhesive portion may include at least one selected from the group consisting of a double-sided tape and a waterproof adhesive.

Silicon may be coated on an external surface of the wiring.

The battery pack may further include a sealing portion that fills outside the wiring and surrounds the wiring, wherein the sealing portion is disposed between the accommodating portion and the cover after the wiring is drawn out of the battery pack.

The accommodating portion and the cover may be bonded to each other by using a thermal fusion method that applies heat to the accommodating portion and the cover to bond the accommodating portion and the cover or an ultrasonic fusion method that applies an ultrasonic wave to bond the accommodating portion and the cover.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description.

Recognizing that sizes and thicknesses of constituent members shown in the accompanying drawings are arbitrarily given for better understanding and ease of description, the present invention is not limited to the illustrated sizes and thicknesses.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. Alternatively, when an element is referred to as being "directly on" another element, there are no intervening elements present.

In order to clarify the present invention, elements extrinsic to the description are omitted from the details of this description, and like reference numerals refer to like elements throughout the specification.

In several exemplary embodiments, constituent elements having the same configuration are representatively described in a first exemplary embodiment by using the same reference numeral and only constituent elements other than the constituent elements described in the first exemplary embodiment will be described in other embodiments.

A secondary battery may be used as a single battery according to the type of external devices it is used for. Also, a battery pack, which is a unit formed by electrically connecting a number of batteries, may be used.

Small-sized devices such as a mobile phone operate for a predetermined period of time according to the capacity of a single battery. However, mobile appliances such as laptop computers, camcorders, machines that consume a large amount of power, such as electromotive bicycles, electronic scooters, electric automobiles, and hybrid electric automobiles, consume a large amount of power for periods of operation.

Electromotive bicycles, electronic scooters, and electric automobiles are usually used outdoors, and in climates where rain or snow may occur, water may penetrate through a battery pack mounted in these machines and may cause a short circuit.

Also, when a large amount of power is supplied by a battery pack, heat generated therefrom should be discharged out of the battery pack, but in conventional battery packs, heat is not easily discharged out of the battery packs, thereby degrading the efficiency of the battery packs.

Figure 1:
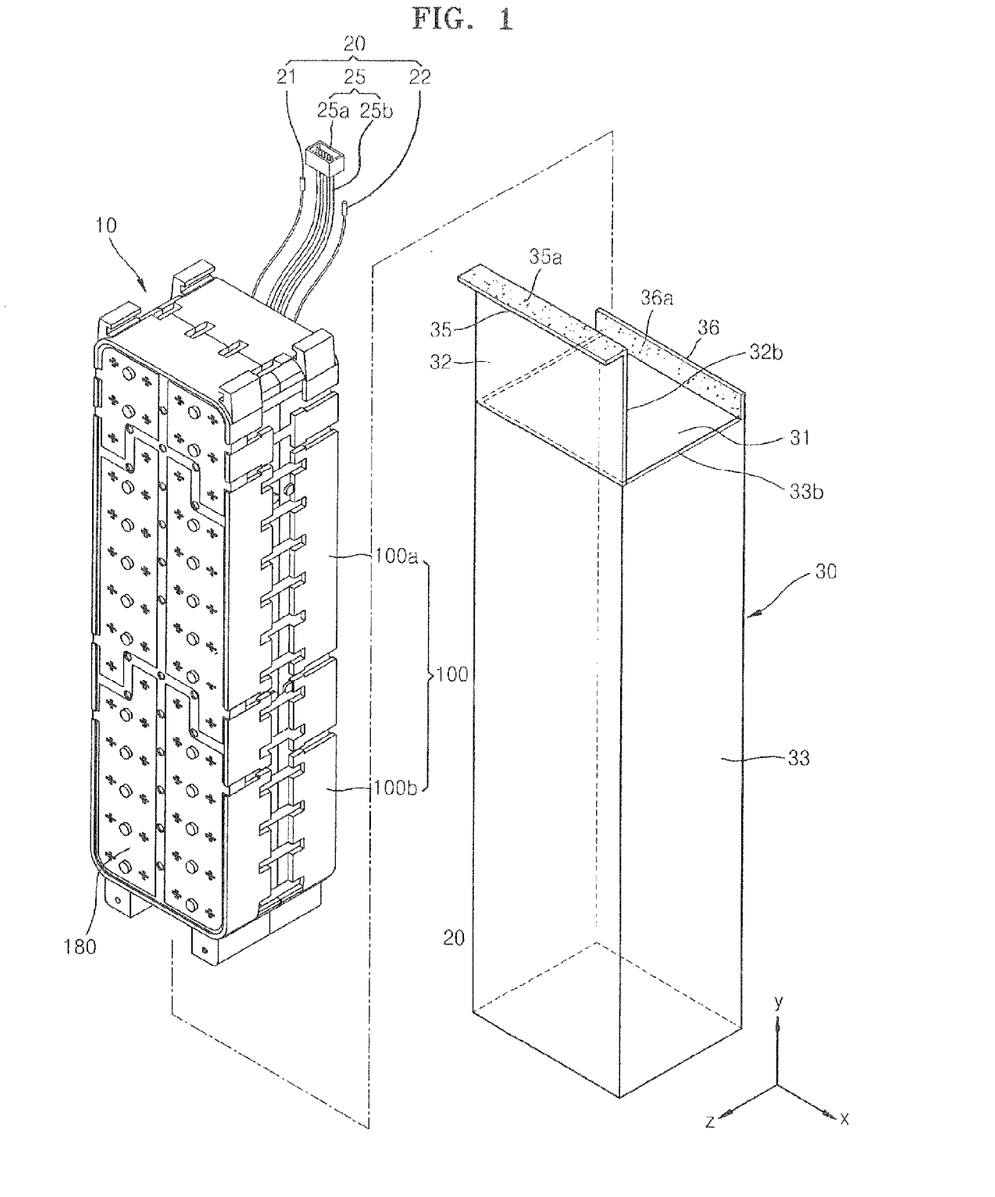
FIG. 1 is a perspective view illustrating an assembly structure of a battery pack according to an embodiment of the present invention.
Figure 2:
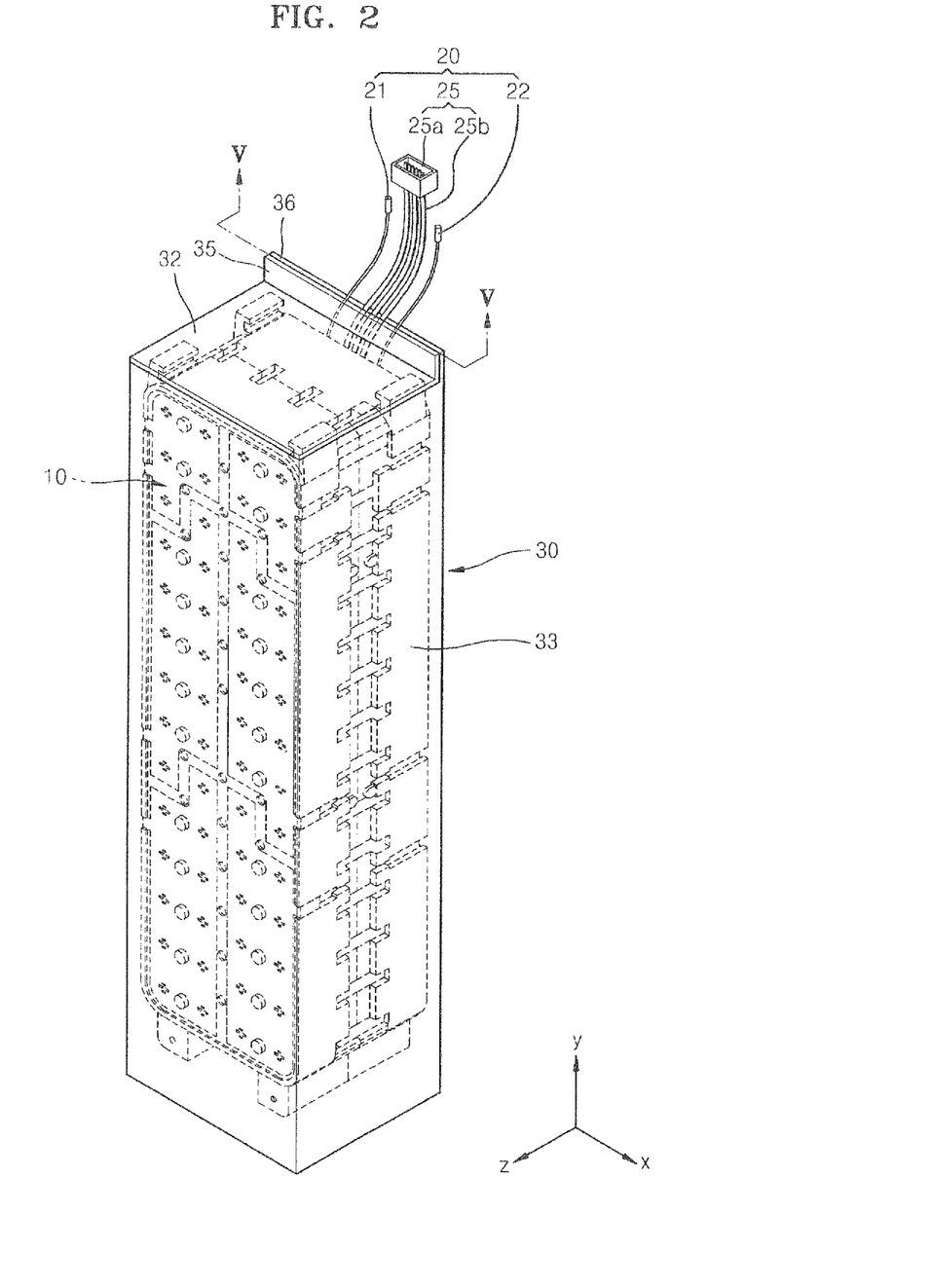
FIG. 2 is a perspective view in which the battery pack of FIG. 1 is assembled.

FIG. 1 is a perspective view illustrating an assembly structure of a battery pack according to an embodiment of the present invention, and FIG. 2 is a perspective view in which the battery pack of FIG. 1 is assembled.

The battery pack illustrated in FIGS. 1 and 2 includes a core pack 10 including a plurality of battery cells 200 (shown in FIG. 3), a waterproof and heat-dissipating case 30 surrounding the core pack 10, and wiring 20 connected to the core pack 10 and extending out of the waterproof and heat-dissipating case 30. A waterproof structure for preventing water penetration may be formed in a portion of the waterproof and heat-dissipating case 30 where the wiring 20 is drawn therefrom.

The core pack 10 may include the plurality of battery cells 200, and a holder case 100 that accommodate the battery cells 200. When the battery cells 200 are accommodated in the holder case 100, a battery pack for charging or discharging electricity is formed.

The battery pack as described above prevents water from penetrating into the waterproof and heat-dissipating case 30 and dissipates heat generated in the core pack 10 out of the battery pack. Accordingly, the performance of the battery pack is improved and structural and electric stability thereof may be improved.

Figure 3:
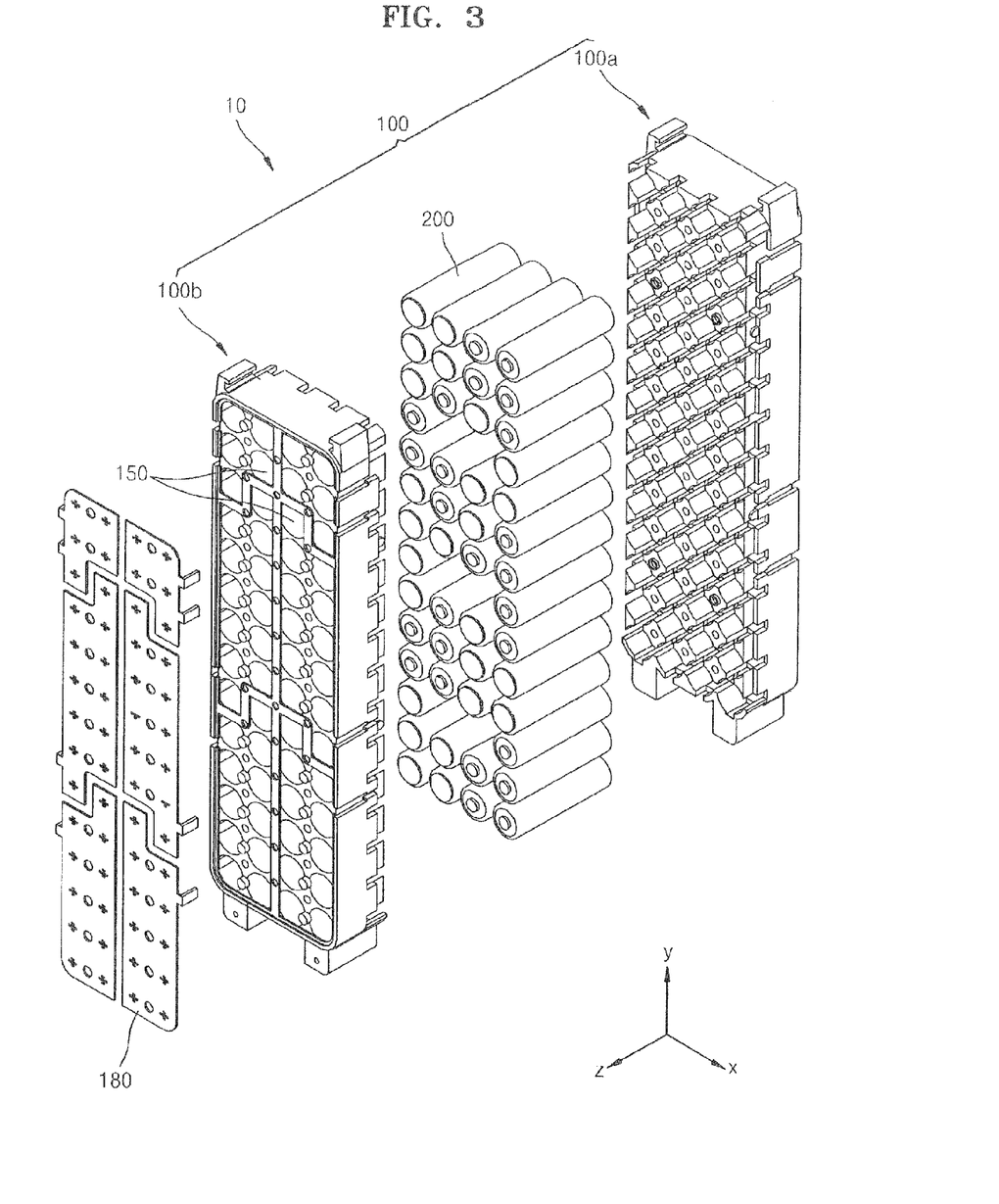
FIG. 3 is an exploded perspective view illustrating a core pack included in the batter pack of FIG. 1.

FIG. 3 is a perspective view illustrating an assembly structure of the core pack 10 included in the battery pack of FIG. 1.

The holder case 100 may have a first case 100a and a second case 100b that are disposed to face each other. The holder case 100 includes a plurality of cell spaces 150 into which the battery cells 200 are to be inserted.

By inserting the battery cells 200 into the cell spaces 150 of the first case 100a and the second case 100b while coupling the first case 100a and the second case 100b to each other, the holder case 100 accommodating the battery cells 200 are assembled completely.

The battery cells 200 accommodated in the holder case 100 may be any secondary batteries that may be charged and discharged. For example, the battery cells 200 may be lithium ion batteries, which are effective in terms of power output and capacity. However, the battery cells 200 are not limited thereto, and other batteries such as nickel-cadmium batteries, nickel-hydrogen batteries, lithium batteries, etc. may also be used.

When the battery cells 200 are mounted in the holder case 100, electrodes of the battery cells 200 are exposed out of the cell spaces 150. A lead plate 180 that connects the plurality of battery cells 200 serially or parallel may be disposed on the holder case 100.

The lead plate 180 includes a metal having electric conductivity, such as nickel, and has a plate shape. Alternatively, the lead plate 180 may be formed of any of various materials having electrical conductivity instead of nickel. The lead plate 180 may be connected to each of the battery cells 200 by welding.

The serial or parallel connection structure of the battery cells 200 mounted in the battery pack or number or arrangement of the battery cells 200 constituting the parallel blocks may be modified. Also, the arrangement of the battery cells 200 of the battery pack is not limited to the embodiment illustrated in the drawing.

Referring to FIG. 1, the core pack 10 described above is inserted into the waterproof and heat-dissipating case 30. The waterproof and heat-dissipating case 30 is formed of a flexible material and has a structure that surrounds the core pack 10. When the core pack 10 is inserted into the waterproof and heat-dissipating case 30, water is prevented from penetrating into the core pack 10, and heat generated in the core pack 10 may be dissipated out of the battery pack through the waterproof and heat-dissipating case 30.

The waterproof and heat-dissipating case 30 may be formed of a fibrous material. Examples of the fiber include polyamide, ceramic fiber, cellulose fiber, woven fabric, and non-woven fabric. The waterproof and heat-dissipating case 30 formed of a fiber may be coated with a resin. The waterproof and heat-dissipating case 30 may be formed of a mixture of a fiber and a resin. Examples of the resin include polyimide, polyethylene imide (PE), polyethylene terephthalate (PET), polytetrafluoro ethylene, and expanded poly tetra fluoro ethylene.

The waterproof and heat-dissipating case 30 may also be formed without a fiber and formed of only a resin material. Examples of the resin include polyimide, polyethylene imide (PE), polyethylene terephthalate (PET), polytetrafluoro ethylene, and expanded poly tetra fluoro ethylene.

Expanded poly tetra fluoro ethylene is also known by a product name, GoreTex™, and is used in waterproof and heat-dissipating clothing products.

The wiring 20 is electrically connected to the core pack 10. The wiring 20 includes large current terminals 21 and 22 that supply a current from the battery cells 200 out of the waterproof and heat-dissipating case 30 or allows a charging current to flow through the battery cells 200, and a balancing line 25 for checking the state of the battery cells 200. The balancing line 25 may include a plurality of signal lines 25b connected to the battery cells 200 and a connector 25a connected to an end portion of the signal lines 25b. The waterproof structure may include a sealing portion 41 that surrounds an external surface of the wiring 220. The sealing portion 41 is divided into three separate portions which separately surround the large current terminals 21 and 22 and the balancing line 25.

When the core pack 10 is inserted into the waterproof and heat-dissipating case 30 as illustrated in FIG. 2, the wiring 20 is drawn out of the waterproof and heat-dissipating case 30 in order to supply a current from the core pack 10 out of the core pack 10 or to supply a charging current to the core pack 10. The wiring 20 is drawn out of the battery pack after the core pack 10 is accommodated in the waterproof and heat-dissipating case 30, and thus a region around the wiring 20 needs to be perfectly sealed so that water does not enter through a portion where the wiring 20 passes through the waterproof and heat-dissipating case 30. Accordingly, a waterproof structure is formed in the portion where the wiring 20 is drawn from the waterproof and heat-dissipating case 30.

The waterproof and heat-dissipating case 30 includes a pocket-shaped accommodating portion 33 for accommodating the core pack 10, an opening portion 31, and a cover 32 for covering the opening portion 31. An end portion of the cover 32 is integrally connected to the accommodating portion 33, and as an edge 32b of the cover 32 is bonded to an edge 33b of the accommodating portion 33 after the core pack 10 is accommodated in the waterproof and heat-dissipating case 30, the waterproof and heat-dissipating case 30 may be sealed. The waterproof structure may be formed by coupling the accommodating portion 33 and the cover 32.

In order to seal the portion where the wiring 20 is drawn from the waterproof and heat-dissipating case 30, a first wing portion 35 is disposed at the other end portion of the cover 32, and a second wing portion 36 is disposed on the accommodating portion 33 to correspond to the first wing portion 35. The first wing portion 35 may be, but not limited thereto, formed at a 90 degree angle to the cover 32. As the first wing portion 35 and the second wing portion 36 are bonded to each other, a bonding portion between the cover 32 and the accommodating portion 33 is formed, and the wiring 20 may be drawn out of the battery pack via the bonding portion between the first wing portion 35 and the second wing portion 36.

The waterproof structure formed in the portion where the wiring 20 is drawn from the battery pack according to the current embodiment of the present invention is not limited to the coupling of the accommodating portion 33 and the cover 32. That is, the waterproof structure may be formed by using any of various structures. For example, a hole through which the wiring 20 may pass is formed in a portion of the waterproof and heat-dissipating case 30, and the wiring 20 may be drawn out of the waterproof and heat-dissipating case 30 through the hole, and at the same time, an edge of the hole surrounding the wiring 20 may be filled with a waterproof adhesive to manufacture the waterproof structure.

Figure 4:
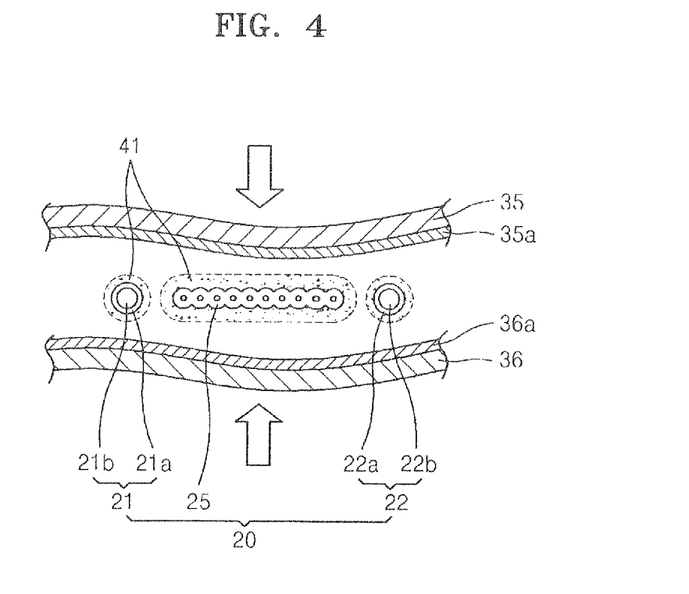
FIG. 4 is a cross-sectional view illustrating a coupling process in which wiring and a waterproof and heat-dissipating case are coupled in the battery pack of FIG. 2.
Figure 5:
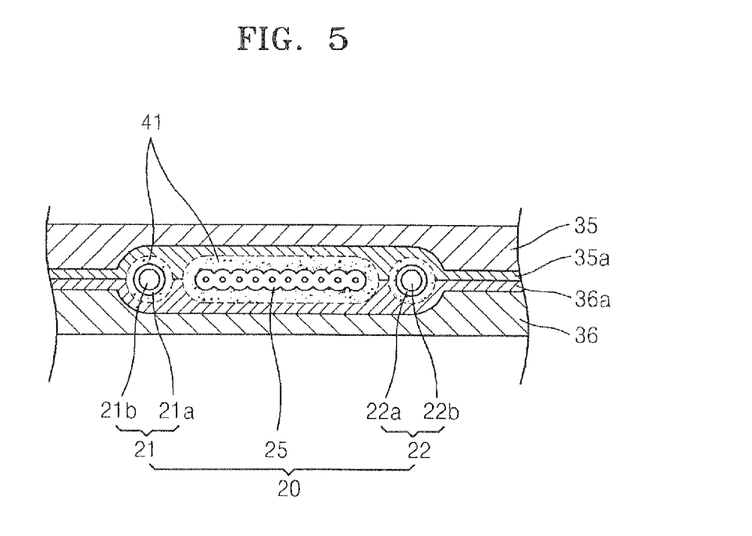
FIG. 5 is a cross-sectional view illustrating the wiring and the waterproof and heat-dissipating case of FIG. 4 bonded together.

FIG. 4 is a cross-sectional view illustrating a coupling process in which the wiring 20 and the waterproof and heat-dissipating case 30 are coupled in the battery pack of FIG. 2. FIG. 5 is a cross-sectional view illustrating the wiring 20 and the waterproof and heat-dissipating case 30 that are bonded to each other in the battery pack of FIG. 2.

The waterproof structure of the battery pack may include adhesive tapes 35a and 36a that are respectively disposed on corresponding surfaces of the first wing portion 35 and the second wing portion 36. The adhesive tapes 35a and 36a bond the first and second wing portions 35 and 36 and the wiring 20. The adhesive tapes 35a and 36a are examples of adhesive portions that bond the accommodating portion 33 and the cover 32 in the bonding portion from where the wiring 20 is drawn, but the embodiment of the present invention is not limited thereto. Alternatively, the accommodating portion 33 and the cover 32 may be bonded by using a waterproof adhesive, a thermal fusion method in which heat is applied to the first and second wing portions 35 and 36 to bond the accommodating portion 33 and the cover 32, or an ultrasonic fusion method in which an ultrasonic wave is applied to the accommodating portion 33 and the cover 32 to bond the accommodating portion 33 and the cover 32.

The large current terminals 21 and 22 of the wiring 20 include conductive lines 21b and 22b formed of an electric conductive material such as copper and coatings 21a and 22a that surround the conductive lines 21b and 22b. The waterproof structure may further include silicon coated on external surfaces of the large current terminals 21 and 22 and a balancing line 25 between the first wing portion 35 and the second wing portion 36. Silicon coating is conducted to completely prevent water penetration due to the wiring 20 and to improve sealing properties of the adhesive tapes 35a and 36a.

After arranging the wiring 20 between the first wing portion 35 and the second wing portion 36, pressure is applied to the first wing portion 35 and the second wing portion 36 so that the bonding portion from where the wiring 20 is drawn from the waterproof and heat-dissipating case 30 is completely sealed as illustrated in FIG. 5. Thus the waterproof structure is completed. According to the waterproof structure described above, water penetration into the waterproof and heat-dissipating case 30 may be effectively prevented.

Figure 6:
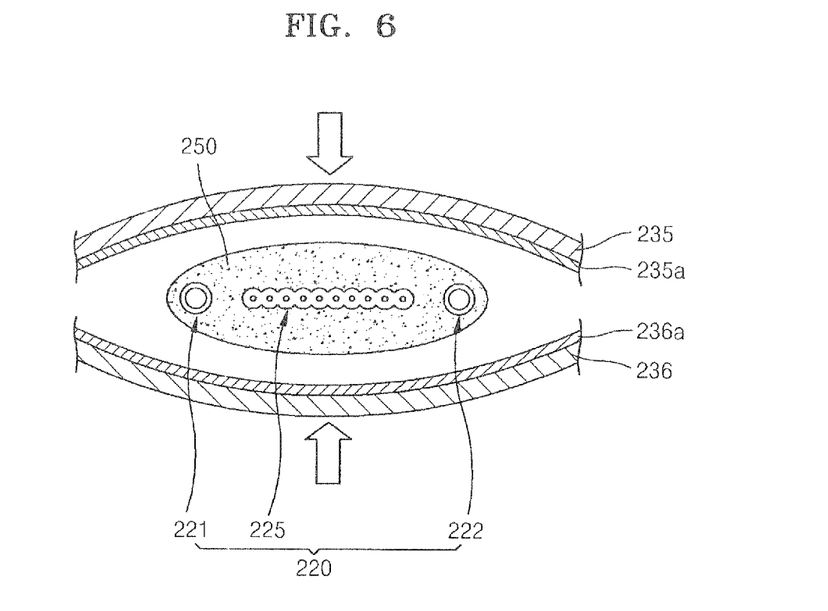
FIG. 6 is a cross-sectional view illustrating a coupling process in which wiring and a waterproof and heat-dissipating case are coupled in a battery pack according to another embodiment of the present invention.

FIG. 6 is a cross-sectional view illustrating a coupling process in which wiring and a waterproof and heat-dissipating case are coupled in a battery pack according to another embodiment of the present invention.

The battery pack illustrated in FIG. 6 has a similar configuration to the battery pack described with reference to the previous embodiment, except that a waterproof structure in a portion from where a wiring is drawn from a waterproof and heat-dissipating structure has been modified.

A first wing portion 235 is disposed in a cover in order to seal a portion from where a wiring 220 is drawn from the waterproof and heat-dissipating case, and a second wing portion 236 is disposed in an accommodating portion of the waterproof and heat-dissipating case corresponding to the first wing portion 235. As the first wing portion 235 and the second wing portion 236 are bonded to each other, a bonding portion between the cover and the accommodating portion is formed, and the wiring 220 may be drawn out of the battery pack via a bonding portion between the first wing portion 235 and the second wing portion 236.

Adhesive tapes 235a and 236a are disposed on corresponding surfaces of the first wing portion 235 and the second wing portion 236, respectively. The adhesive tapes 235a and 236a bond the first and second wing portions 235 and 236 and the wiring 220. The adhesive tapes 235a and 236a are examples of an adhesive portion that bonds the accommodating portion and the cover in a bonding portion from where the wiring 220 is drawn, but the embodiment of the present invention is not limited thereto. Alternatively, a waterproof adhesive may be used, or a thermal fusion method in which heat is applied to the first wing portion 235 and the second wing portion 236 to bond the accommodating portion and the cover or an ultrasonic fusion method in which an ultrasonic wave is applied to the accommodating portion and the cover may be used to bond the accommodating portion and the cover.

Large current terminals 221 and 222 of the wiring 220 include a balancing line 225. The waterproof structure may include a sealing portion 250 that surrounds an external surface of the wiring 220. The sealing portion 250 supports the wiring 220, ensures prevention of water penetration due to the wiring 220, and improves adhesion properties of the adhesive tapes 235*a* and 236*a* to improve the sealing properties. Examples of the sealing portion 250 include a rubber, a resin material, and an adhesive.

After arranging the wiring line 220 surrounded by the sealing portion 250, between the first wing portion 235 and the second wing portion 236, pressure is respectively applied to the first wing portion 235 and the second wing portion 236 so that sealing of the bonding portion where the wiring 220 is drawn from the waterproof and heat-dissipating structure is ensured. According to the waterproof structure according to the embodiment of the present invention, water penetration through the waterproof and heat-dissipating case may be effectively prevented.

According to the embodiments of the present invention as described above, water may be effectively prevented from coming into a battery pack as a core pack is accommodated in a waterproof and heat-dissipating case. Also, heat generated during an operation of battery cells of the core pack may be dissipated out of the battery pack by using the waterproof and heat-dissipating case. In addition, a bonding portion of the waterproof and heat-dissipating case forms a seal around wiring electrically connected to the core pack and extending out of the battery pack, thereby forming a waterproof structure. Accordingly, water penetration due to the wiring may be effectively prevented.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A battery pack, comprising:
    a core pack including a plurality of battery cells;
    a waterproof and heat-dissipating case formed of a flexible material and surrounding the core pack; and
    wiring that is electrically connected to the core pack and extending out of the waterproof and heat-dissipating case, said wiring including a first current terminal, a second current terminal, and a balancing line disposed between the first and second large current terminal; and
    a waterproof structure having a sealing portion to prevent water penetration is formed in a portion of the waterproof and heat-dissipating case from which the wiring is drawn, said sealing portion is composed of three sealing portions which separately surround each of the first and second current terminals and the balancing line.

2. The battery pack of claim 1, wherein the core pack further comprises:
    a holder case including a plurality of cell spaces in which the plurality of battery cells are accommodated.

3. The battery pack of claim 2, wherein the plurality of battery cells include terminals that are exposed out of the cell spaces and the core pack, the terminals include a lead plate that connects the terminals of the plurality of battery cells to one another.

4. The battery pack of claim 1, wherein the flexible material comprises:
    a fibrous material selected from the group consisting of polyamide, ceramic-based fiber, cellulose fiber, woven fabric, and non-woven fabric.

5. The battery pack of claim 4, wherein one selected from the group consisting of polyimide, polyethylene imide (PE), polyethylene terephthalate (PET), poly tetra fluoro ethylene, and expanded poly tetra fluoro ethylene is combined to the fibrous material.

6. The battery pack of claim 1, wherein the flexible material comprises:
    a material selected from the group consisting of polyimide, polyethylene imide (PE), polyethylene terephthalate (PET), poly tetra fluoro ethylene, and expanded poly tetra fluoro ethylene.

7. The battery pack of claim 1, wherein the waterproof structure comprises:
    an accommodating portion including an opening portion at one side through which the waterproof and heat-dissipating case accommodates the core pack and a cover that covers the opening portion, the wiring is drawn out of the battery pack via a bonding portion between the accommodating portion and the cover.

8. The battery pack of claim 7, further comprising:
    an adhesive portion that bonds the accommodating portion, the cover, and the wiring, between the accommodating portion and the cover.

9. The battery pack of claim 8, wherein the adhesive portion comprises at least one selected from the group consisting of a double-sided tape and a waterproof adhesive.

10. The battery pack of claim 9, wherein silicon is coated on an external surface of the wiring.

11. The battery pack of claim 7, further comprising:
    a sealing portion that fills outside the wiring and surrounds the wiring, wherein the sealing portion is disposed between the accommodating portion and the cover after the wiring is drawn out of the battery pack.

12. The battery pack of claim 11, further comprising:
    an adhesive portion that bonds the accommodating portion and the cover and the sealing portion between the accommodating portion and the cover.

13. The battery pack of claim 12, wherein the adhesive portion comprises at least one selected from the group consisting of a double-sided tape and a waterproof adhesive.

14. The battery pack of claim 7, wherein the accommodating portion and the cover are bonded to each other by using a thermal fusion method that applies heat to the accommodating portion and the cover to bond the accommodating portion and the cover or an ultrasonic fusion method that applies an ultrasonic wave to bond the accommodating portion and the cover.

15. A battery pack, comprising:
    a core pack;
    a plurality of battery cells in the core pack;
    a waterproof and heat-dissipating case formed of a flexible material and surrounding the core pack, the waterproof and heat-dissipating case includes a pocket-shaped accommodating portion that accommodates the core pack, an opening portion, a cover that covers the opening portion, a first wing portion disposed at an end portion of the cover, and a second wing portion that is disposed on the pocket-shaped accommodating portion and corresponds to the first wing portion;
    wiring that is electrically connected to the core pack and extends out of the waterproof and heat-dissipating case, said wiring including a first current terminal, a second current terminal, and a balancing line disposed between the first and second large current terminal; and
    a waterproof structure preventing water penetration is formed between the first wing portion of the cover and the second wing portion of the waterproof and heat-dissipating case from which the wiring extends out of the waterproof and heat-dissipating case, the waterproof structure includes a sealing portion that surrounds an external surface of the wiring, said sealing portion is composed of three sealing portions which separately surround each of the first and second current terminals and the balancing line.

16. The battery pack of claim 15, wherein the waterproof and heat-dissipating case is a fibrous material selected covered or containing a resin.

* * * * *